(12) United States Patent
Gerbier et al.

(10) Patent No.: US 7,198,132 B2
(45) Date of Patent: Apr. 3, 2007

(54) TILLER FOR A PEDESTRIAN-CONTROLLED FORK-LIFT TRUCK

(75) Inventors: Stephane Gerbier, Cuy (FR); Stephane Launay, Chiffreville (FR)

(73) Assignee: Jungheinrich Aktiengesellschaft, Hamburg (DE)

( * ) Notice: Subject to any disclaimer, the term of this patent is extended or adjusted under 35 U.S.C. 154(b) by 446 days.

(21) Appl. No.: 10/767,691

(22) Filed: Jan. 29, 2004

(65) Prior Publication Data

US 2004/0251073 A1    Dec. 16, 2004

(30) Foreign Application Priority Data

Feb. 8, 2003    (EP) ................... 03002873

(51) Int. Cl.
*B60K 26/00* (2006.01)
(52) U.S. Cl. ..................................... 180/333
(58) Field of Classification Search ................. 180/333
See application file for complete search history.

(56) References Cited

FOREIGN PATENT DOCUMENTS

| CA | 1 105 894 | 7/1981 |
|---|---|---|
| DE | 297 10 503 | 9/1997 |
| FR | 2355122 A | * 2/1978 |

* cited by examiner

Primary Examiner—Faye M. Fleming

(57) ABSTRACT

A tiller for a pedestrian-controlled fork-lift truck, comprising a hollow tiller rod which has its lower end hinged to a support for a steerable wheel and has its other end connected to a loop-shaped handle which, at the rear end, has a gripping portion extending crosswise to the tiller rod, a retaining extension extending into the interior of the handle as an elongation of the tiller rod, a handle means pivotally supported by the retaining extension which is coupled to a lifting means via a pusher or puller element within the tiller rod, wherein the handle means having an intermediate neutral pivoting position and two opposed pivoting positions in which it actuates the lifting means for a lifting or lowering operation, characterized in that the handle means is a loop-shaped elongated gripping element including two approximately parallel extending long element portions which extend crosswise to the tiller axis, and two curved, short element portions (interconnecting the long element portions which are located adjacent to the lateral gripping portions of the tiller handle with the element portions being approximately in a common plane and the longer element portion facing the pedestrian-controlled fork-lift truck being pivotally supported by the retaining extension.

21 Claims, 4 Drawing Sheets

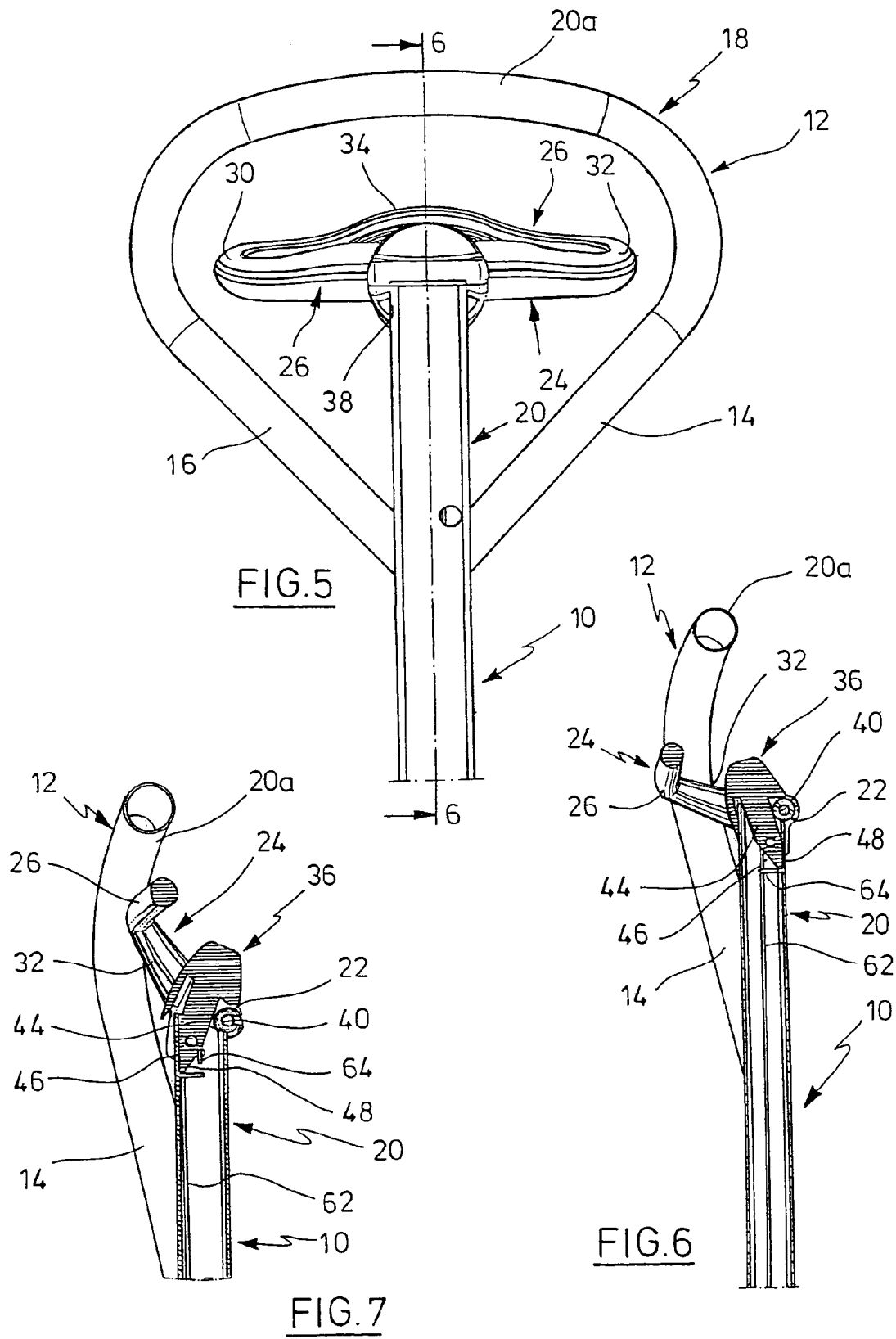

TILLER FOR A PEDESTRIAN-CONTROLLED FORK-LIFT TRUCK

CROSS-REFERENCE TO RELATED APPLICATIONS

Not applicable.

STATEMENT REGARDING FEDERALLY SPONSORED RESEARCH

Not applicable.

BACKGROUND OF THE INVENTION

In pedestrian-controlled fork-lift trucks in current use, the tiller is employed for steering and moving the vehicle and for pumping to lift the load. The operation of the lifting means requires a control element which is to be well accessible and allows a change-over between the lift, lower, and travel functions and also enables the load to be lowered very cautiously.

A requirement which is particularly important for efficient work with the pedestrian-controlled fork-lift truck is that the control element be well accessible, particularly when the vehicle is being pulled, i.e. the tiller is in an inclined position in front of the vehicle. Therefore, it is less important to perform the functions with the tiller in an upright position, e.g. when the vehicle is being pushed, because the vehicle is pulled out from between the pallets in most cases, whereupon the tiller is brought to the inclined position again.

To allow the vehicle to be pumped and moved, it is beneficial for the tiller to be graspable in its centre in order to avoid unnecessary steering and frictional forces. The forces acting on the control element should be as small as possible in all situations. In particular, the control element should be operable in a relatively easy way in all situations.

It is known to use an elongation of the tiller rod, that passes through a loop-shaped handle, as a bearing component for a laterally extended actuating lever. The disadvantage of the known tiller head is that it cannot be grasped in its centre. From DE 297 10 503 U1, it is further known to pivotally support a control lever by the upper end of the rod portion which extends into the loop-shaped handle. The lever has to be pushed away from the operator to lower the load. Pulling the lever towards the operator will switch on the lift function. The disadvantage of this construction is that the operator cannot operate the functions well while he pulls the vehicle because the control lever needs to be pulled upwards to cause a lowering motion.

Moreover, the control element is unsuitable for intuitive operation because the control element is not familiar from other technical devices. The operational forces are large because of the small distance of the circle point from the lever fulcrum.

It is the object of the invention to provide a tiller for a pedestrian-controlled fork-lift truck which is readily operable intuitively by the left or right hand and in which the tiller tube can be grasped in the centre with the operational forces being as small as possible.

BRIEF SUMMARY OF THE INVENTION

In the inventive tiller, the handle for actuating the pusher or puller element is a loop-shaped, elongated gripping element which has two longer, approximately parallel element portions and two element portions which interconnect them and are preferably curved where the gripping element extending crosswise to the tiller axis is pivotally supported by an elongate element portion on the retaining extension, preferably about an axis transverse to the axis of the retaining extension or tiller rod.

Such a gripping element has the advantage that it may be easily actuated from each position of the operator relative to the tiller, i.e. from positions of the operator behind the tiller handle or from his side. Further, it does not matter in which inclined position the tiller is. Thus, for example, when the tiller is grasped by the same hand the thumb may pivot the gripping element to one or the other direction, i.e. upwards or downwards, starting from a neutral position.

Since the gripping element is located within the tiller handle and has no portions strikingly protruding from the plane thereof this also avoids any unconscious actuation of the gripping element or any damage.

According to an aspect of the invention, the long element portion associated with the transverse portion of the handle is provided with a sub-portion approximately in the central region that is cambered towards the transverse portion to achieve even more comfortable actuation. The cambered sub-portion may be cambered out of the plane of the gripping element, preferably upwardly, when the tiller is viewed from behind the tiller head.

An ergonomically favourable aspect of the invention provides that the plane of the handle is inclined away from the fork-lift truck and the retaining extension at an acute angle with respect to the rod axis, the long end portion of the gripping element facing the transverse portion of the handle being located approximately in the handle plane. Therefore, in the neutral position, the element portion facing the transverse portion of the handle is mounted so as to be protected within the handle plane.

According to another aspect of the invention, the pivoting axis of the gripping element is at an upper edge of the retaining extension that faces the fork-lift truck. The retaining extension is hollow and an actuating portion of the gripping element protrudes into the retaining extension which, in turn, is connected to the pusher or puller element. According to another aspect of the invention, the actuating portion is provided with opposed, inclined stop surfaces which bear on the inner wall of the retaining extension each when the gripping element is in the pivoted actuating positions.

According to another aspect of the invention, the actuating portion has snapping means which interact with the retaining extension to cause the gripping element to be snapped into the neutral position. For example, snapping can be done by means of a snapping ball which is biased by a spring and interacts with an opening of the retaining extension. Preferably, snapping balls are arranged in a transverse bore of the actuating portion at the ends each and are biased by a spring in the transverse bore. According to another aspect of the invention, the spring can be surrounded by a sleeve in the transverse bore which, in turn, extends through an eye of the pusher or puller element.

In the intermediate region of one longer element portion, the gripping element has a thickened supporting portion through which a bearing pin can extend for pivotally supporting the gripping element on the retaining extension. For this purpose, a bearing sleeve can be mounted at the upper edge of the retaining extension. According to another aspect of the invention, the supporting portion has a recess into which the upper end of the retaining extension is extended. A certain spacing exists between the outer wall of the retaining extension and the inner walls of the recess so as to enable the gripping element to be pivoted.

According to another aspect of the invention, it is preferred that the gripping element including its actuating portion be integrally formed, i.e. from a plastic, a metal alloy or another suitable material.

Some pedestrian-controlled fork-lift trucks are provided with a brake which is actuated by a control cable. For this purpose, a brake lever requires to be mounted on the tiller head. In this conjunction, another aspect of the invention provides that a curved, hollow extension into which a cable is passed for a cable brake be mountable on the side facing the fork-lift truck on the retaining extension at a spacing from the gripping element. The upper end of the curved extension has pivotally supported thereby a brake lever, the cable being connected to the end portion of the brake lever that protrudes into the hollow extension. The brake lever is preferably pivotable in a plane which extends approximately in parallel with the plane of the handle. However, the pivoting plane of the brake lever can also be inclined towards the transverse portion of the tiller handle so that when the brake lever is actuated it is pulled towards the transverse portion of the handle. The brake lever is preferably shaped angularly with one leg being supported on the extension and the other one forming the gripping portion. The brake lever helps in achieving a cautious braking of the pedestrian-controlled fork-lift truck, e.g. when the fork-lift truck is to be driven down a ramp.

However, it is advantageous to arrest the brake to keep the pedestrian-controlled fork-lift truck in place when it stands in front of a slope, for example. In this conjunction, another aspect of the invention provides that a two-armed snapping lever which is biased by a spring is tiltably supported in a slot of the brake lever, one arm being associated with the gripping portion of the brake lever and the other arm interacting with a stop surface of the extension after the brake lever is pivoted through a predetermined angle. A snapping action takes place when the brake lever has been pulled to an extent ensuring an efficient braking engagement. This snapped position may be easily released again by grasping the arm of the snapping lever by the gripping portion of the brake lever.

BRIEF DESCRIPTION OF THE SEVERAL VIEWS OF THE DRAWINGS

The invention will be described in more detail below with reference to an embodiment shown in the drawings.

FIG. 5 shows a representation similar to FIG. 2, but with the gripping element actuated, FIG. 6 shows a section through the representation of FIG. 5 along line 6—6, FIG. 7 shows a representation similar to FIG. 6, but with the gripping element actuated in an opposite direction.

DETAILED DESCRIPTION OF THE INVENTION

Figure 1:
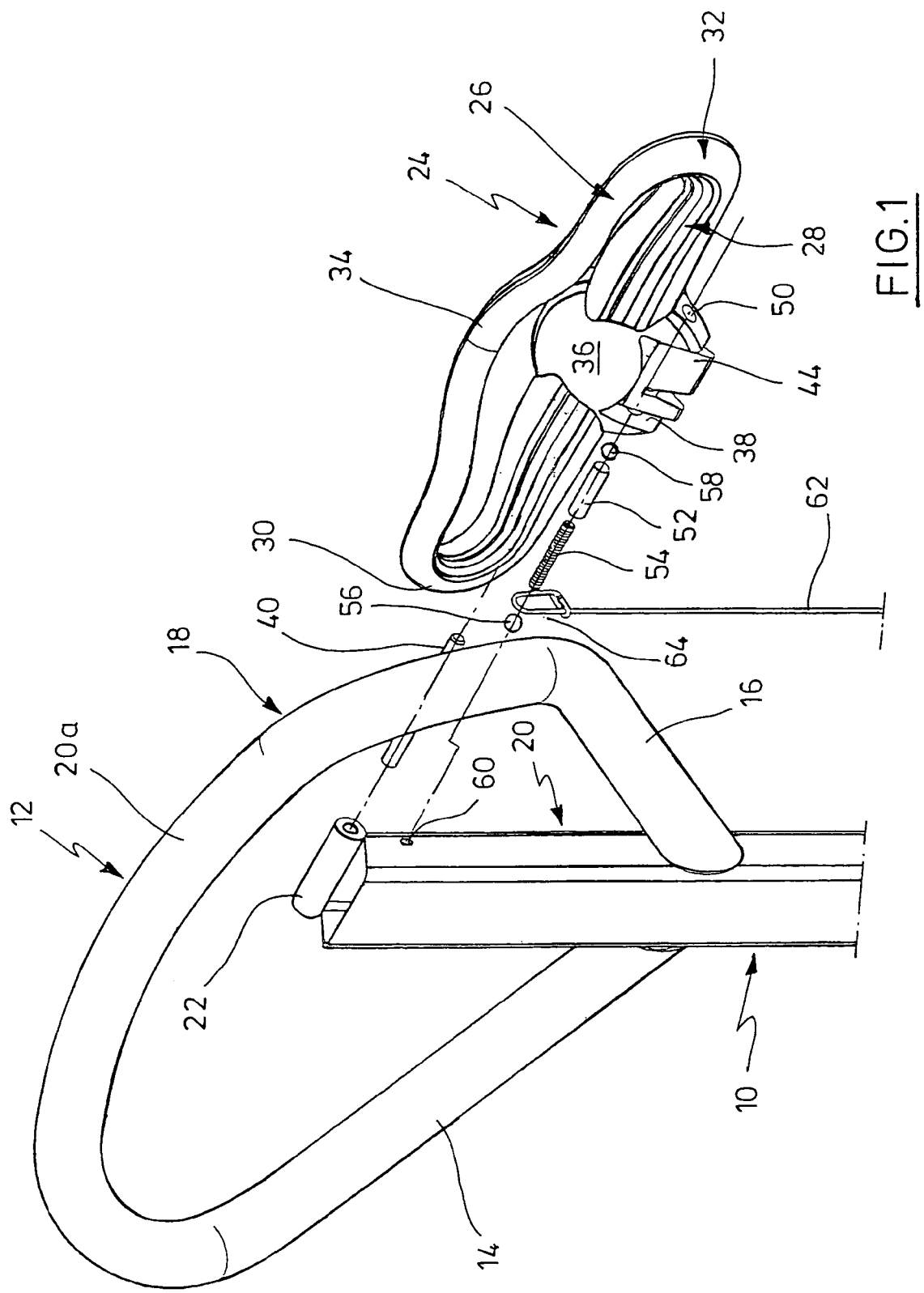
FIG. 1 shows a tiller head according to the invention in a perspective view and exploded representation.

While this invention may be embodied in many different forms, there are described in detail herein a specific preferred embodiment of the invention. This description is an exemplification of the principles of the invention and is not intended to limit the invention to the particular embodiment illustrated In the Figures, the outer end of a tiller rod is shown at 10 for a pedestrian-controlled fork-lift truck which is not shown in detail. The way such a tiller 10 is mounted and operated is known in general and, hence, will not be explained in more detail. The tiller rod 10 is hollow and is rectangular in cross-section. A loop-shaped handle 12 is connected to the tiller rod 10. It comprises two relatively straight portions 14, 16 which approximately form a right angle from each other and are obliquely welded to the tiller rod 10 at opposed sides, for example, and a portion 18 bent in a C shape which is connected to the portions 14, 16 and, in the intermediate region, forms a gripping portion 20a which extends approximately crosswise to the axis of the tiller 10. The shape of such a tiller handle is generally known.

Extended into the handle 12 is a retaining extension 20 as an elongation of the rod 10. At an edge of its upper end, it has a bearing sleeve 22 which extends over the width of the rod and retaining extension 20. The sleeve 22 is arranged on the edge facing the fork-lift truck which is not shown.

Figure 2:
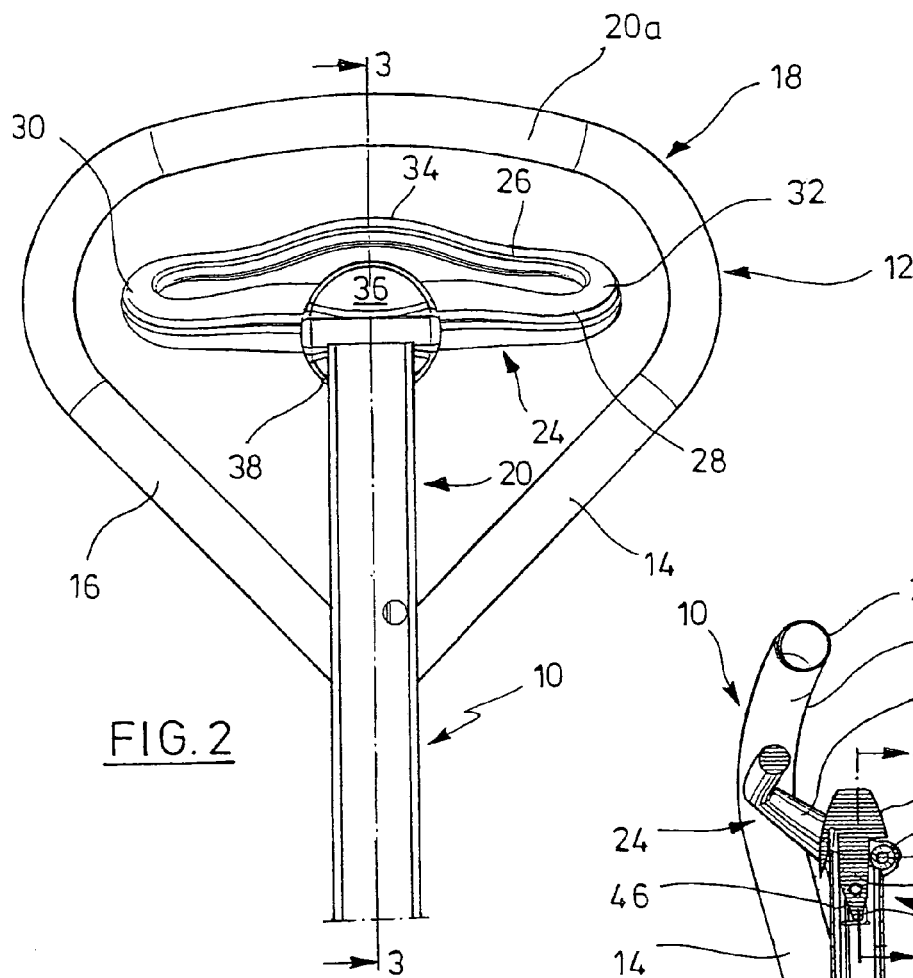
FIG. 2 shows a side view of a tiller head according to the invention as viewed from the pedestrian-controlled fork-lift truck.

As can be appreciated from FIG. 2, for example, the upper end of the retaining extension 20 supports an elongate gripping element 24 which extends crosswise to the retaining extension 20 and is shown separately in FIG. 1. The gripping element 24 has two longer portions 26, 28 which extend approximately in parallel and are joined to each other at the ends via curved portions 30, 32. The elongate gripping element becomes ovally looped in this way, but with the longer element portion 26 being cambered out away from the other portion 28 in the center at 34. The element portions 26, 28, 30, and 32 essentially span a common plane from which the cambered portion 34 slightly rises upwards.

Figure 3:
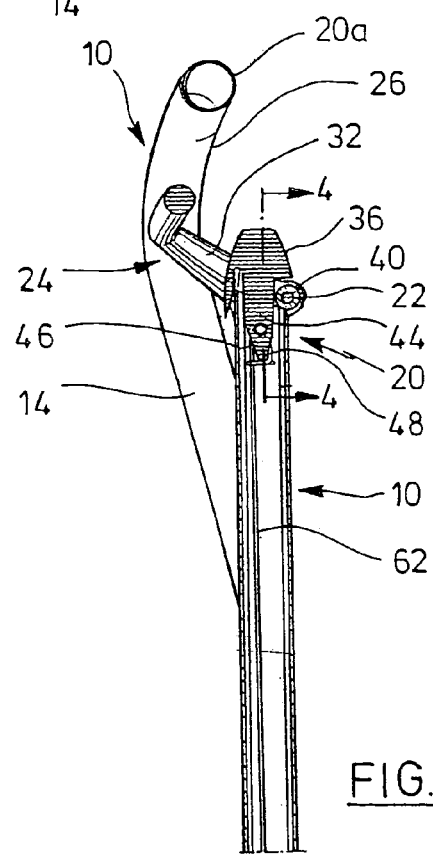
FIG. 3 shows a section through the representation of FIG. 2 along line 3—3.

The element portions 26, 28 essentially extend crosswise to the tiller axis and the joining portions 30, 32 are located to be relatively adjacent to the curved portions of the gripping portion 18 that face it. The longer element portion 26 is located to be relatively adjacent to the gripping portion 20a and, for the rest, also approximately in the plane of the handle 12 which as is evident from FIG. 3 is slightly inclined from the axis of the tiller 10, namely towards the operator if he stands in front of the fork-lift truck which is not shown. Therefore, the element portion 26 is protected by the handle 12. By the way, it can be appreciated that it is readily operable in all gripping positions and all standing positions which the operator can take relative to the tiller 10. The gripping element 24 is pivotally supported about an axis crosswise to the axis of the tiller 10. Reference to the way of supporting is made below.

The handle 24 is integrally formed and the element portion 28 has a thickened supporting portion 36 which has an approximately circular contour as viewed from the vehicle, and has a recess 38 into which the upper end of the retaining extension 20 can be introduced. At this stage, the bearing sleeve 22 gets into an alignment with two transverse bores (not shown) through which a bearing pin 40 (FIG. 1) is slipped which is additionally passed through the bearing sleeve 22. In this way, the gripping element 24 is supported to be pivotable about the bearing pin 40.

Within the recess 38, the supporting portion 36 has an actuating portion 44 which projects into the retaining extension 20 and has stop surfaces 46, 48 on opposed sides. The way the upper end of the retaining extension 20 is received in the supporting portion 36 can also be seen in FIG. 4. It is further appreciated that the actuating portion 44 has a transverse bore 50 which seats a sleeve 52 which receives a helical spring 54. At the end of the transverse bore 52, the spring sets two snapping balls 56, 58 under a stress, causing them to snappingly engage an opening 60 and 62 in the retaining extension 20. Hence, the gripping element 24 is snapped into the position shown in FIG. 3, which is also the neutral position.

Guided in the tiller rod 10 is a pusher rod 62 which is in communication with a lifting means (not shown) for the fork-lift truck at the lower end. At the upper end, the rod 62 has an eye 64 (FIG. 1) which is passed into the actuating portion 44 through a slot 66, which enables the sleeve 52 to extend through the eye 64. When the gripping element 24 is pivoted to the positions shown in FIGS. 6 or 7, the pusher rod 62 is caused to be displaced, reference to which fact will be made farther below.

Figure 4:
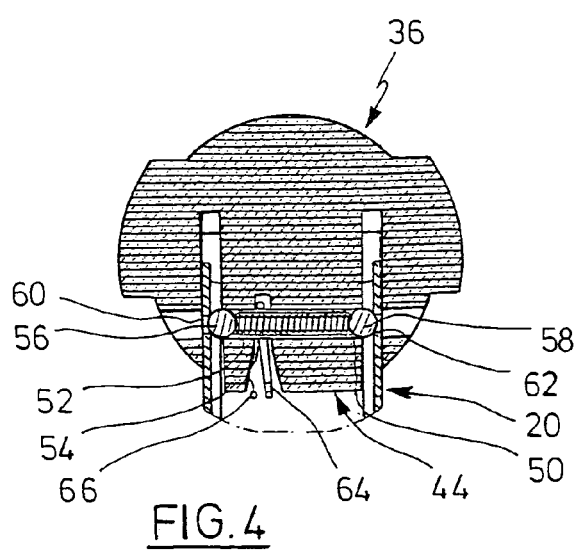
FIG. 4 shows an enlarged section through the representation of FIG. 3 along line 3–4.

The operator stands on the left-hand side of the tiller with respect to FIGS. 3, 6, and 7 whereas the vehicle which is not shown is arranged on the right-hand side. As can be seen from these Figures the gripping element 24 of FIG. 3 takes an intermediate position into which it is snapped as is shown in FIG. 4. In this position, the actuating portion 44 projects centrally into the retaining extension 20. When the operator pulls the gripping element 24 towards him, pivoting it counterclockwise as is shown in FIG. 6, the actuating portion 44 will pivot to the right whereby the oblique surface 48 comes to bear on the wall of the retaining extension 20 that faces it, thus limiting the pivoting movement. In this position of the gripping element 24, the pusher rod 62 is pulled downwardly, thus actuating the valve (not shown) for the lifting means, which causes the fork of the pedestrian-controlled fork-lift truck to be raised when the tiller performs an appropriate pumping motion. The pusher rod 62 is biased by a spring so that when the gripping element 24 is released it will be automatically pivoted back to the neutral snapping position of FIG. 3.

When the operator actuates the gripping element 24 in the opposite direction according to FIG. 7 the stop surface 46 of the actuating portion 44 comes to bear against the opposite wall of the retaining extension 20. During this movement of the actuating portion 44, the pusher rod 62 is moved upwards, which brings the pumping valve to a position in which the hydraulic fluid is directed back to a reservoir from the lifter cylinder, which allows the fork to be lowered by its own weight or the weight of the load.

Figure 8:
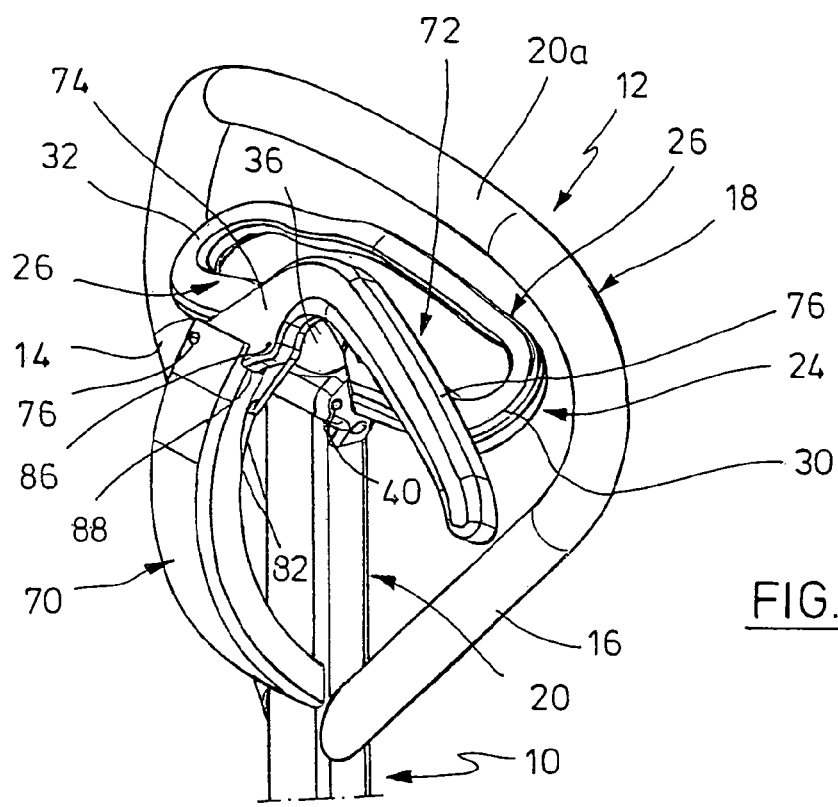
FIG. 8 shows a tiller head comparable to that of FIG. 2, but additionally having a brake lever in a non-actuated position.
Figure 9:
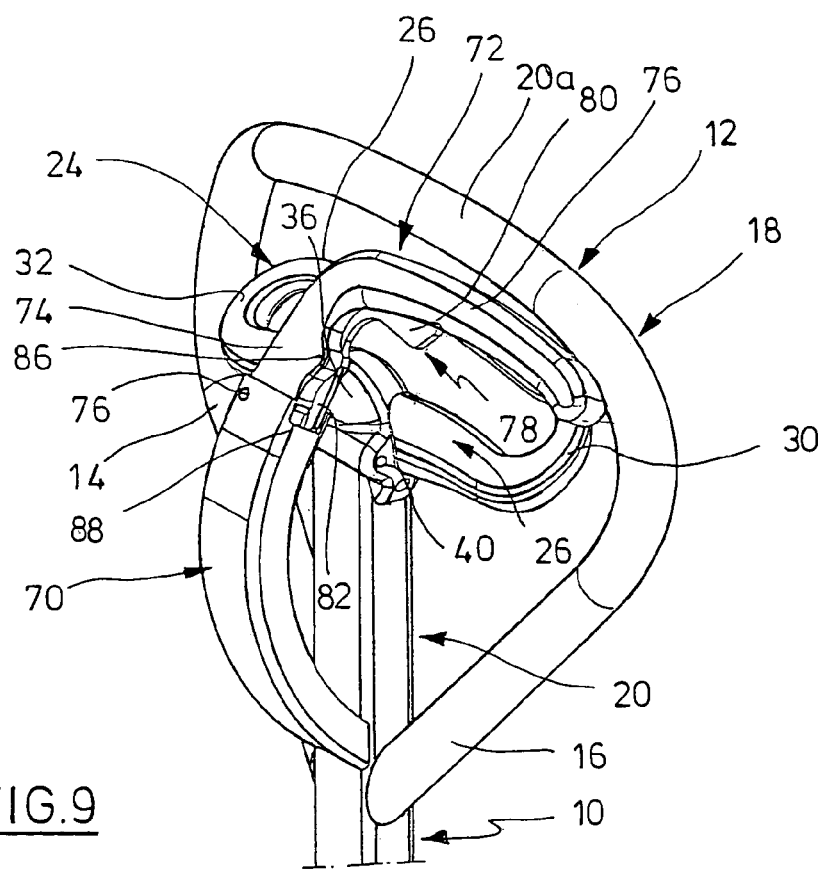
FIG. 9 shows a representation similar to FIG. 8, but with the brake lever snapped into place.

FIGS. 8 and 9 show the tiller handle according to the foregoing Figures so that parts which are identical to those of FIGS. 1 to 7 are given identical reference numbers. In FIGS. 8 and 9, a curved tube-like extension 70 is connected to the retaining extension 20, e.g. by welding. Coupling is performed approximately in the area in which the portions 14, 16 are laterally mounted on the tiller rod 10. The tubular extension 70 extends upwards up to the level of the supporting portion 36 of the gripping element 24. The tubular extension 70 is fixed to the retaining extension 20 by welding, for example. However, it is also imaginable to mount it releasably.

An approximately rectangular brake lever 72 has a first leg 74 and a second leg 76. The first leg 74 extends into the tubular extension 70 and is pivotally supported by the extension 70 about a pivoting axis 76. The pivoting axis is approximately perpendicular to the axis of the rod 10 or the plane which is spanned by the handle 12. Connected to the leg 74 (which is not shown) is the upper end of a control cable which is passed through the tiller rod 10 and interacts with a brake at the other end. In the rest position, the leg 76 which constitutes the gripping portion for the brake lever 72 extends somewhat downwards as is illustrated in FIG. 8. When actuated, the brake lever 72 is pivoted in a counter-clockwise sense with the maximal pivoting path being outlined in FIG. 9 where the gripping portion 76 extends approximately in parallel with the gripping portion 20a. The operator can actuate the brake lever when he grasps the handle 12 at the same time.

A slot of the brake lever 72 has supported therein a snapping lever 78 which, in turn, is approximately rectangular and has an actuating portion 80 and a stop portion 82. The pivoting axis of the snapping lever 78 can be recognized at 86. The snapping lever 78 is biased by a spring which is not shown and normally is in a position as shown in FIG. 8 in which the actuating portion 80 is sunk into the slot of the brake lever 72 while the stop portion 82 bears against the outer surface of the tubular extension 70. The tubular extension 70 has a recess 88 at the upper end. While the brake lever 72 is pivoted for braking purposes according to FIG. 9 and when the pivoting movement is performed to such an extent that the free end of the stop portion 82 reaches the recess 88 the spring will pivot the snapping lever 78 clockwise so that the stop portion 82 interacts with the bottom of the recess 88 as is shown in FIG. 9. In this way, the brake lever 72 snaps in and the brake is locked in place. When the brake is intended to be released the operator grasps the actuating portion 80 of the snapping lever 78 that protrudes from the slot and pulls it into the slot, which causes the stop portion 82 to get out of engagement with the recess 88. This enables the brake lever 72 to automatically pivot back to the position shown in FIG. 8.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A tiller for a pedestrian-controlled fork-lift truck, comprising a hollow tiller rod having upper and lower ends, which has its lower end hinged to a support for a steerable wheel and has its upper end connected to a loop-shaped handle which has a gripping portion extending crosswise to the tiller rod, a retaining extension extending into the interior of the handle as an elongation of the tiller rod, a handle means pivotally supported by the retaining extension which is coupled to a lifting means via a pusher or puller element within the tiller rod, wherein the handle means having an intermediate neutral pivoting position and two opposed pivoting positions in which it actuates the lifting means for a lifting or lowering operation, characterized in that the handle means is a loop-shaped elongated gripping element (24) including two approximately parallel extending long element portions (26, 28) which extend crosswise to the tiller axis, and two curved, short element portions (30, 32) interconnecting the long element portions (26, 28) which are located adjacent to the lateral gripping portions of the tiller handle (12) with the element portions being approximately in a common plane and the longer element portion (28) facing the pedestrian-controlled fork-lift truck being pivotally supported by the retaining extension (20).

2. The tiller according to claim 1, characterized in that the one of the two approximately parallel extending long element portions, approximately centrally has a sub-portion (34) which is cambered out towards the crosswise extending gripping portion (20a).

3. The tiller according to claim 2, characterized in that the sub-portion (34) is cambered out upwardly from the plane of the element portions.

4. The tiller according to claim 1, characterized in that the plane of the handle (12) is inclined away from the fork-lift truck at an acute angle wit respect to the rod axis and the long element portion (26) facing the transverse portion (20) of the handle (12) is located approximately in the handle plane.

5. The tiller according to claim 1, characterized in that the pivoting axis of the gripping element (24) is at the upper edge of the retaining extension (20) that faces the fork-lift truck and an actuating portion (44) of the gripping element (24) protrudes into the hollow retaining extension (20) wherein the pusher or puller element (62) is mounted on the actuating portion (44).

6. The tiller according to claim 5, characterized in that the actuating portion (44) has opposite stop surfaces (46, 48) at the inner end which bear on an inner wall of the retaining extension (20) in the opposed pivoting positions of the gripping element (24).

7. The tiller according to claim 5, characterized in that the actuating portion (44) has snapping means which interact with the retaining extension (20) to cause the gripping element (24) to be snapped into the neutral position.

8. The tiller according to claim 7, characterized in that the snapping means have at least one snapping ball (56, 58) biased by a spring (54) which interacts with an opening (60, 62).

9. The tiller according to claim 8, characterized in that the actuating portion (44) has a transverse through bore (50) at the ends of which a snapping ball each (56, 58) is arranged, the snapping balls (56, 58) being biased by a spring (54) in the transverse bore (50).

10. The tiller according to claim 9, characterized in that the spring (54) is surrounded by a sleeve (52) in the transverse bore (50) and the sleeve (52) extends through an eye (64) of the pusher or puller element (62).

11. The tiller according to claim 5, characterized in that the upper edge of the retaining extension (20) has mounted thereon a bearing sleeve (22) which is extended through by a bearing pin (40) which, at the ends, is seated in a transverse bore which is seated in a thickened supporting portion (36) of the element portion (28).

12. The tiller according to claim 11, characterized in that the retaining extension (20) projects into a recess (38) of the supporting portion (36) with a spacing being provided between the walls of the recess (38) and the wall of the retaining extension (20).

13. The tiller according to claim 11, characterized in that the supporting portion (36) is concavely cambered towards the transverse portion (20a) of the tiller head (12).

14. The tiller according to claim 11, characterized in that the supporting portion (26) is of a circular contour as viewed from the operator side of the pedestrian-controlled fork-lift truck.

15. The tiller according to claim 1, characterized in that the gripping element (24) including the actuating portion (44) is integrally formed from a plastic, a metal alloy or another suitable material.

16. The tiller according to claim 1, characterized in that a curved hollow extension (70), into which a cable is passed for a cable brake of the pedestrian-controlled fork-lift trunk, can be mounted an the retaining extension (20) at a spacing from the gripping element (24), a brake lever (72) is pivotally supported at the upper end of the extension (70) with the cable being joined to the end portion (74) of the brake lever (72) that projects into the hollow extension (70).

17. The tiller according to claim 16, characterized in that the brake lever (72) is pivotable in a plane which extends approximately in parallel with the plane of the tiller handle (12).

18. The tiller according to claim 16, characterized in that the brake lever (72) is angularly shaped, one leg being supported by the extension (70) and the other one forming a gripping portion.

19. The tiller according to claim 16, characterized in that a two-armed snapping lever (78) which is biased by a spring is tiltably supported in a slot of the brake lever (72), one arm (80) being associated with the gripping portion (76) of the brake lever (72) and the other arm (82) interacting with a stop surface of the extension (70) after the brake lever (72) is pivoted through a predetermined angle.

20. The tiller according to claim 19, characterized in that the free end of the extension (70) has formed thereon a recess (88) the bottom of which constitutes the stop surface.

21. The tiller according to claim 17, characterized in that the extension (70) is adapted to be releasably attached to the retaining extension (20).

* * * * *